Oct. 20, 1953  A. WIRTH  2,656,176
WEIGHING MACHINE
Filed Feb. 6, 1950  2 Sheets-Sheet 1
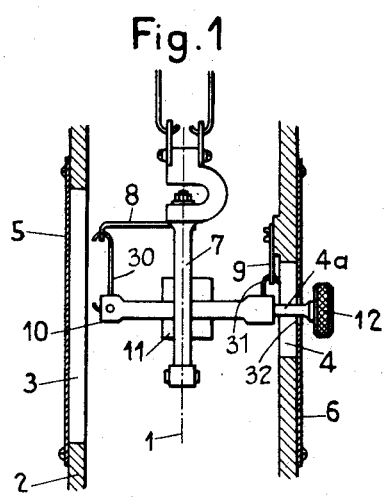
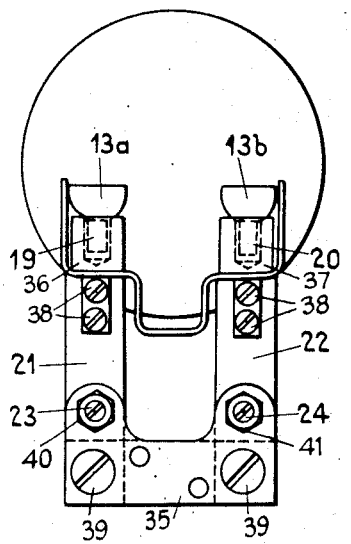
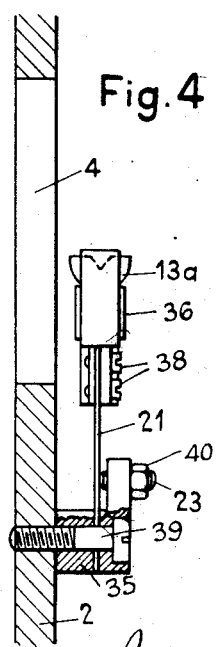

Oct. 20, 1953 A. WIRTH 2,656,176
WEIGHING MACHINE
Filed Feb. 6, 1950 2 Sheets-Sheet 2
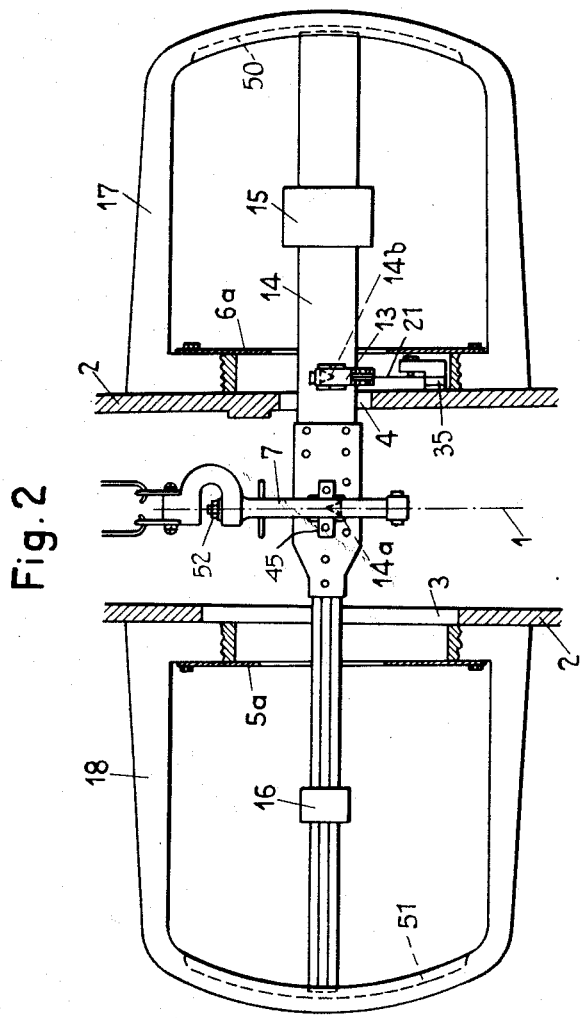
Inventor
Armin Wirth
By
Singer Stern & Carlberg
attys Patented Oct. 20, 1953

2,656,176

UNITED STATES PATENT OFFICE 2,656,176

WEIGHING MACHINE

Armin Wirth, Zurich, Switzerland

Application February 6, 1950, Serial No. 142,551
In Germany February 8, 1949

4 Claims. (Cl. 265—56.5)

This invention relates to a weighing machine of the type having a load supporting lever system, an indicator device and a connecting member connecting said lever system with the indicator device.

The principal object of the invention is to provide a weighing machine of the type indicated above which may readily be converted from weighing without a tare weight to weighing with a tare weight.

Another object of the invention is to provide in said member connecting the lever system with the indicator device, a yoke member arranged to cooperate with a beam which is fulcrumed to a fixed part of the machine and provided with a movable weight, the movements of which change the setting of the indicator device.

A further object of the invention is to provide said beam with an extension carrying a counterweight to compensate for the increased initial load on the lever system in tare weighing.

Other objects and advantages of the invention will be apparent from the following description with reference to the accompanying drawings, in which:

Fig. 1 is an elevation of a part of a weighing machine enclosed in a column forming part of the frame of the weighing machine, said column being shown in vertical cross-section, Fig. 2 is a similar view of a modified embodiment of the invention, and Figs. 3 and 4 are detailed views of the embodiment shown in Fig. 2.

In Fig. 2 a tension rod indicated merely by a center line 1 extends upwards from a lever system (not shown) located under a weighing platform (not shown) at the bottom of a hollow column 2 forming part of the frame of the weighing machine. The upper end of the tension rod 1 is connected with an indicator device (not shown) and in a well known manner the arrangement is such that the tension rod 1 tends to pull the platform upwards, thus to move the indicator to the negative side of the zero mark.

The column 2 is provided with two oppositely disposed openings 3, 4, and a bracket 35 is secured to the outside of the column 2 below the opening 4 by means of screws 39. Said bracket 35 carries two leaf springs 21, 22 which extend upwards from the bracket 35 and at their upper ends carry pillow blocks 13a and 13b, respectively. Said pillow blocks 13a and 13b are screwed at 19 and 20, respectively, into members 36 and 37 which are secured to the leaf springs 21 and 22, respectively, by means of screws 38. Adjustment screws 23, 24 are in threaded engagement with the bracket 35 and abut against the leaf springs 21 and 22, respectively, thus providing a means for lateral adjustment of the location of the pillow blocks 13a and 13b, respectively. The adjustment screws 23, 24 can be locked in desired position by means of lock nuts 40 and 41, respectively.

A beam 14 extends through the openings 3 and 4 and is supported on the pillow blocks 13a, 13b by means of knife edges 14b secured to said beam 14. The beam 14 also extends through the yoke 7 and is provided with another knife edge 14a disposed in reversed direction in relation to the knife edges 14b. This knife edge 14a is in engagement with a reversed pillow block 45 secured to the yoke 7, preferably by means of a screw and nut 52.

A weight 15 is carried by one arm of the beam 14, while another smaller weight 16 is carried by the other arm of the beam 14. Brackets 17, 18 are secured to the outside of the column 2 and provided with recesses, or guide grooves 50 and 51, respectively, into which the ends of the beam 14 extend. Apertured covers 5a, 6a are removably attached to the brackets 18 and 17, respectively, over the openings 3 and 4, respectively.

This embodiment of the invention is primarily intended for use in tare weighing. When a tare weight is placed on the platform of the weighing machine, it is obvious that it will cause the indicator to show increased weight by pulling the tension rod 1 downwards. By moving the weight 15 to a proper position on the beam 14 this tendency towards downward movement of the tension rod 1 can be counteracted, and preferably this adjustment is carried to a point where the indicator again occupies a position close to the zero mark of the indicator device. Final adjustment to position the indicator exactly on the zero mark is then effected by movement of the smaller weight 16 in the proper direction on the beam 14.

Obviously, this embodiment of my invention can be used also for tareless weighing by proper adjustment of the weights 15 and 16, i. e., by moving the weight 15 far to the left on its supporting arm and adjusting the weight 16 to properly counteract the upward force on the yoke 7.

However, the equipment is unnecessarily complicated and expensive for tareless weighing and, in cases where the machine is to be used exclusively for such tareless weighing, I, therefore, prefer to replace some of this equipment with a simpler and less expensive mechanism of basically the same function. An example hereof is shown in Fig. 1, wherein identical parts bear the same reference marks as in Figs. 2–4.

The yoke 7 is provided with a lateral bracket 8 which is secured to the yoke by means of the screw and nut 52 and connected with one end of a beam 10 by means of a link 30. The other end of the beam 10 is provided with a hook 31 by means of which the beam 10 is carried in a bracket 9 secured to the inside of the hollow column 2. The beam 10 carries a weight 11.

The two oppositely disposed openings 3 and 4 are closed by removable covers 5 and 6, respectively. The cover 6 is provided with an aperture 32 and through this aperture 32 a rod 4a extends which is screw threaded into the end of the beam 10 and provided with a knob 12 on its free end.

The arrangement of the beam 10, the weight 11 and the screw 4a, 12 is such that when the screw 4a, 12 is screwed as far into the beam 10 as possible, the indicator in the indicator device occupies a position at the positive side of the zero mark. Accordingly, it is obvious that by turning the knob 12 in a direction to move the screw 4a, 12 out from its innermost position in the beam 10, the weight of the knob 12 will, to an increasing extent, counteract the action of the weight 11 and move the indicator towards or past the zero mark. Thus, it is possible, by proper adjustment of the screw 4a, 12, to place the indicator exactly on the zero mark in the indicator device.

In converting the embodiment shown in Fig. 1 to the tare weighing embodiment of Figs. 2 to 4, the screw 4a, 12 is removed and also the covers 5 and 6. The beam 10 is then unhooked from the brackets 8 and 9 and removed through one of the openings 3, 4. The nut 52 is unscrewed and the bracket 8 removed and replaced by the pillow block 45. The bracket 35 with the pillow blocks 13a, 13b, is secured to the column 2 and the beam 14 is inserted through the openings 3 and 4 and through the yoke 7 and placed in proper position with the knife edges 14a and 14b in engagement with their respective pillow blocks. The brackets 17 and 18, together with the apertured covers 6a and 5a, respectively, are then secured to the column and the weights 15 and 16 are adjusted as indicated above. Conversion from the embodiment of Figs. 2 to 4 into the embodiment of Fig. 1 is, of course, a reversal of this procedure.

It is obvious, therefore, that I have provided a weighing machine which may readily be converted from weighing without tare to weighing with tare, or vice versa, through exchange of a few parts only. The above description of a preferred form of the invention is not intended as a limitation on the details and dimensions described and illustrated except as provided for in the following claims, since obvious modifications will occur to a person skilled in the art.

What I claim is:

1. In a weighing machine of the type having a load supporting lever system and an indicator device with a member connecting said lever system with said indicator device, a yoke in said connecting member, a support member, a beam extending through said yoke, a first knife edge on said beam transversely thereof, a pillow block on said support member in engagement with said knife edge, a second knife edge on said beam parallel with said first knife edge, a pillow block in said yoke in engagement with said second knife edge, a weight on said beam exercising a downward force on said yoke, means on said beam for counteracting said downward force, and means for adjusting the effect of said counteracting means.

2. In a weighing machine of the type having a load supporting lever system and an indicator device with a member connecting said lever system with said indicator device, a yoke in said connecting member, a support member, a beam extending through said yoke, a first knife edge on said beam transversely thereof, a pillow block on said support member in engagement with said knife edge, a second knife edge on said beam parallel with said first knife edge, a pillow block in said yoke in engagement with said second knife edge, a first weight on said beam at the opposite side of said second knife edge from said first knife edge, means for adjusting the position of said first weight longitudinally of said beam, a counterweight on said beam at the opposite side of said knife edges from said first weight, and means for adjusting the position of said counterweight longitudinally of said beam.

3. In a weighing machine of the type having a load supporting lever system and an indicator device with a member connecting said lever system with said indicator device, a yoke in said connecting member, a support member, a beam extending through said yoke, a first knife edge on said beam transversely thereof, a pillow block on said support member in engagement with said knife edge, a second knife edge on said beam parallel with said first knife edge, a pillow block in said yoke in engagement with said second knife edge, a first weight on said beam at the opposite side of said second knife edge from said first knife edge, means for adjusting the position of said first weight longitudinally of said beam, a counterweight on said beam at the opposite side of said knife edges from said first weight, means for adjusting the position of said counterweight longitudinally of said beam, guide brackets secured to said support member, and vertically extending guide grooves in said guide brackets for receiving and guiding the ends of said beam.

4. A weighing machine as set forth in claim 3, in which said support member comprises a fixed hollow column, a bracket secured to said column, a cantilever type leaf spring secured to said bracket and extending upwards therefrom in a plane perpendicular to said beam, said first pillow block being secured to the upper end of said leaf spring, and means for adjusting said leaf spring in a direction longitudinal of said beam.

ARMIN WIRTH.

References Cited in the file of this patent
UNITED STATES PATENTS

| Number | Name | Date |
|---|---|---|
| 1,295,967 | Buckingham | Mar. 4, 1919 |
| 1,504,555 | Hapgood | Aug. 12, 1924 |
| 1,626,961 | Osgood | May 3, 1927 |
| 1,870,233 | Bryce | Aug. 9, 1932 |
| 1,988,655 | Hamblin | Jan. 22, 1935 |
| 2,285,927 | Hem | June 9, 1942 |
| 2,456,178 | Dimick | Dec. 14, 1948 |